US007268316B2

(12) United States Patent
Baldauf et al.

(10) Patent No.: US 7,268,316 B2
(45) Date of Patent: Sep. 11, 2007

(54) METHOD FOR CLEANING A RESONATOR

(75) Inventors: Heinrich Baldauf, Stuttgart (DE); Thomas Walter, Renningen (DE); Guenter Bertsch, Stuttgart (DE); Gilbert Mörsch, Stuttgart (DE); Horst Mueller, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/240,612

(22) Filed: Sep. 29, 2005

(65) Prior Publication Data

US 2006/0138898 A1 Jun. 29, 2006

(30) Foreign Application Priority Data

Sep. 29, 2004 (DE) ...................... 10 2004 047 798

(51) Int. Cl.
*B23K 26/38* (2006.01)
*B23K 26/12* (2006.01)

(52) U.S. Cl. ................................................ 219/121.69

(58) Field of Classification Search ........... 219/121.61, 219/121.68, 121.69, 121.71
See application file for complete search history.

(56) References Cited

U.S. PATENT DOCUMENTS 3,965,439 A * 6/1976 Firester ....................... 372/12
4,220,842 A * 9/1980 Sturmer et al. ........ 219/121.84
4,288,679 A * 9/1981 La Rocca .............. 219/121.84
4,412,330 A * 10/1983 Mauck et al. ................. 372/13
4,872,181 A * 10/1989 Johnson et al. ............... 372/10
5,204,867 A * 4/1993 Koschmann ................. 372/10
5,339,323 A * 8/1994 Hunter et al. ................. 372/10
6,227,436 B1 * 5/2001 Nishikawa et al. .... 219/121.68
6,512,198 B2 * 1/2003 Eisele et al. ........... 219/121.71
6,635,850 B2 * 10/2003 Amako et al. ......... 219/121.69
2003/0052101 A1 * 3/2003 Gu et al. ............... 219/121.69
2004/0160283 A1 8/2004 Walter et al.
2005/0155958 A1 * 7/2005 Arai et al. ............. 219/121.61

FOREIGN PATENT DOCUMENTS

DE 19708254 9/1997
DE 19640127 4/1998
DE 101 19 033 1/2003
EP 0297506 1/1989
JP 11-57631 A * 3/1999
JP 11-285887 A * 10/1999
JP 2003133879 5/2003
JP 2004-200494 A * 7/2004

* cited by examiner

*Primary Examiner*—Geoffrey S. Evans
(74) *Attorney, Agent, or Firm*—Kenyon & Kenyon LLP

(57) ABSTRACT

A method for cleaning a resonator in an oscillator, a laser being first used for the adjustment of the resonator, in that, using the laser, a dielectric material of the resonator is removed until a specified frequency is attained; the resonator being cleaned using the laser after the attaining of the specified frequency, in order to remove deposited products of the removal process.

16 Claims, 2 Drawing Sheets

METHOD FOR CLEANING A RESONATOR

FIELD OF THE INVENTION

The present invention relates to a method for cleaning a resonator, in an oscillator, that was previously adjusted to an allocated frequency using a laser, after achieving the pre-specified frequency, the resonator being cleaned using the laser, in order to remove deposit products of the removal process.

BACKGROUND INFORMATION

A method for adjusting a resonator in an oscillator is described in German Patent Application No. DE 101 19 033, which stands out in that a dielectric material as resonator in the oscillator is purposefully removed (ablated) by laser pulses until a targeted frequency is achieved. As the laser, in this case, preferably an excimer laser or a solid-state laser is used.

In this method, it is a disadvantage that, during the removal of the dielectric material, in order to set the frequency of oscillation, a part of these ablation products condenses on the pill-box resonator or on the immediate circuit environment and there forms a dust layer or a firmly adhering condensate film. This deposit first of all lowers the resonator frequency again and leads, especially by slow ablation over the service life of the resonator, to a creeping frequency increase, and thereby to a reliability problem. The usual cleaning methods are not applicable in this case, since the screening box, having only a small aperture to let through the laser beam, does not permit any effective cleaning possibilities.

SUMMARY OF THE INVENTION

An object of the present prevention is to provide a method whereby the deposit of the ablation products on the pill-box resonator or on the immediate circuit environment of the pill-box resonator is prevented, in order to avoid a frequency change caused by the dust layer formed or the adhering condensate film, as well as to prevent an additional frequency change during the service life of the product as a result of a slow ablation of this dust layer or the adhering condensate film.

In an advantageous manner, the cleaning of the resonator takes place using the laser, in that the laser is operated at low power. By cleaning the pill-box resonator while using the same laser that is used for the frequency adjustment of the resonator, one achieves that no further apparatus is required for carrying out the closing cleaning process. In this context, the laser is operated at a lower power than during the removal, whereby only the ablation products are removed which have deposited on the pill-box resonator and on the circuit in the direct environment of the resonator.

Furthermore, it is advantageous that the laser power is reduced, in that the laser is operated at a higher pulse frequency than during the resonator adjustment. Since, advantageously, excimer lasers or solid-state lasers are used which work in pulse operation, one is able to increase the laser pulse frequency, which, during the removal amounts to, for instance, 30 kHz to, for instance, 100 kHz, whereby the pulse repetition rate is increased in such a way that the pulse pumping time of the laser level, and consequently the inversion achieved, becomes lower. Therewith the laser power given off also becomes lower. This is particularly advantageous since solid-state lasers are in principle not able to make possible a rapid power change-over within the required clock pulse time by changing the current.

In addition, it is of advantage that, for cleaning the resonator, the pulse frequency of the laser is increased to the extent that the power given off goes down to $\frac{1}{5}$ to $\frac{1}{10}$ of the laser power during the removal.

It is also of advantage that the area of the pill-box resonator or the circuit processed using the cleaning step is bigger than the area processed during the removal. During laser removal it may be advantageous not to remove the entire resonator surface, but rather leaving unprocessed a small edge area of the upper side of the resonator, having an edge width of ca. 0.1 mm, so that the pill-box resonator keeps its cylindrical shape during the removal, and no splintering off occurs at the edge. During the cleaning step, advantageously, the entire resonator surface is processed, as well as, possibly, the areas of the circuit around the pill-box resonator, so that even deposits on the circuit in the immediate area around the resonator are freed from contamination and condensate films.

Moreover, it is advantageous that, during the laser removal or the laser cleaning, the surroundings are flushed with helium. Since the processing of the pill-box resonator takes place through a small aperture in the cover of the oscillator housing, it is not possible, during the removal or during the cleaning step, to carry off the ablation products by a gas flow, so that it is of advantage to surround the pill-box resonator with helium during the laser processing. Since helium atoms are lighter than air molecules, the evaporated ceramic components are better able to flow away from the pill-box surface and the circuit surface, since the backscattering through the protective gas is less than through air.

Additional features, application possibilities and advantages of the present invention are yielded by the subsequent description of exemplary embodiments of the present invention, which are shown in the figures of the drawings. In this context, all the described or illustrated features per se or in any combination form the subject matter of the present invention, independently of their combination in the claims or their antecedents, as well as independently of their formulation or illustration in the description or in the drawings.

DETAILED DESCRIPTION

For radar applications, especially in automotive technology, it is necessary to make available an oscillator that generates signals in the gigahertz range. Since, in particular, methods such as Doppler frequency shift are used for the detection of objects, an exact determination and setting of the resonator frequency of the oscillator is necessary. An oscillator has a passive and an active part. The active part, an amplifier is, in this case, a high frequency transistor T, such as is, for instance, an HEMT (high electron mobility transistor) or an HBT (heterobipolar transistor). These transistors are mostly produced from compound semiconductors. The passive part is the resonator. In this case, it is formed by a dielectric material whose electrical equivalent circuit diagram may be formed of resistors, capacitors and inductors, if necessary. In producing the oscillator, the oscillator frequency, that is, the frequency of the signal that the oscillator generates, is made possible by an exact modification of the resonator. Since a dielectric material is used in this case as the resonator, this dielectric material has to be changed by a geometrical adaptation for setting the resonator frequency. This is achieved directly at the resonator circuit by a laser, in that the laser, which is preferably operated in a pulsed fashion, removes the dielectric material. Since the oscillator circuit is closed, using a metallic cover, this metallic cover has a bore through which the laser is able to be directed onto the dielectric material, for the removal.

Figure 1:
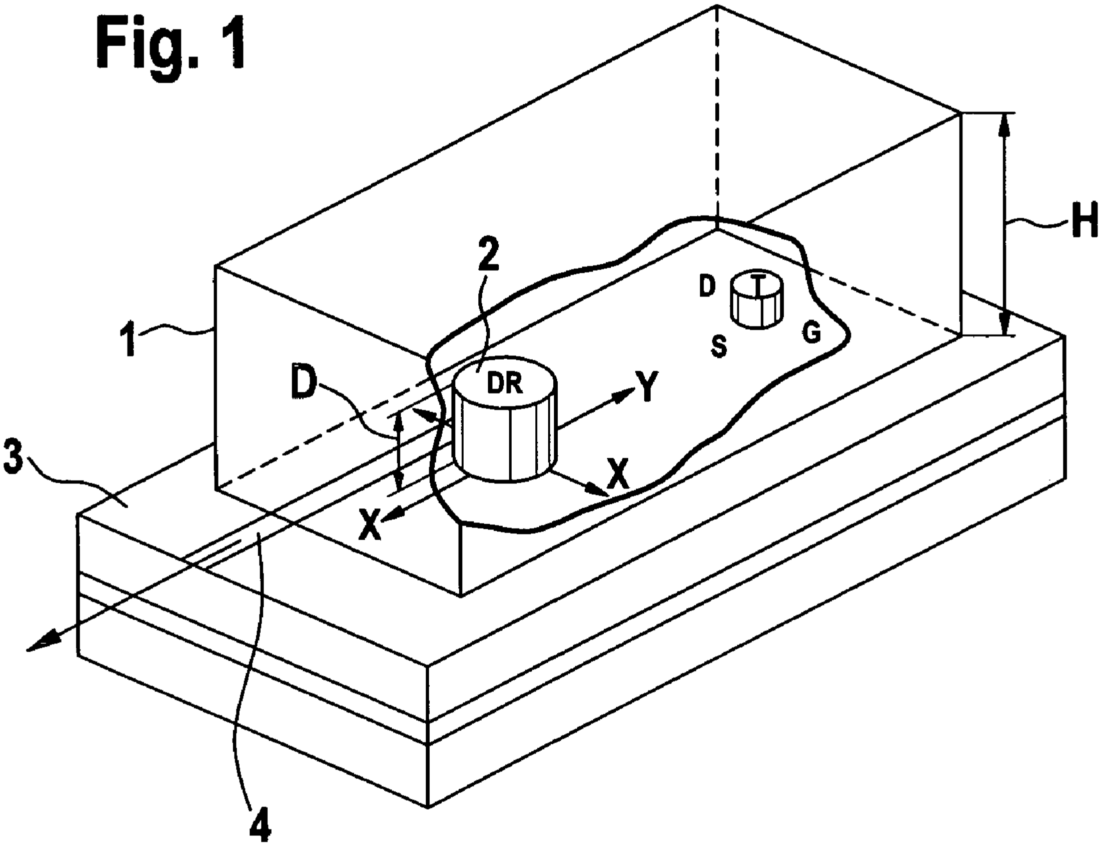
FIG. 1 shows a three-dimensional arrangement of the oscillator.

FIG. 1 shows an oscillator device having a pill-box reonator 2. On a substrate 3, the oscillator circuit is situated, made up of a transistor T with its electrode drain D, source S and gate G, a pill-box resonator DR and microstrip lines 4. The transistor is connected via microstrip lines 4, on the one hand, to an output of the oscillator, and, on the other hand, to the dielectric pill-box resonator 2. Pill-box resonator 2 has a height D which may be changed by removal, using a laser. However, the height determines the electrical properties of pill-box resonator 2, and also its capacitance, inductivity and its resistance, that is, its impedance. The impedance, in turn, determines the oscillator frequency. Thus, by changing then height D, a change in the oscillator frequency or resonator frequency is achieved. As the transistor T, in this case a HEMT (high electron mobility transistor) is used, which, in particular, is suitable for gigahertz applications. Alternatively, it is possible to use an HBT (heterobipolar transistor). Metal cover 1 surrounding the oscillator circuit has a height H and a bore, not shown, that lies directly above the pill-box resonator. The laser beam is guided through this bore, in order to remove pill-box resonator for the frequency setting, and in order subsequently to be able to carry out a cleaning of the pill-box resonator and of the surrounding circuit of ablation products of the removal process. A ceramic is used as the material for pill-box resonator 2, for instance a compound of strontium, barium and tantalum oxides. However, using other ceramics, that is, dielectric materials is possible. After the adjustment subsequent to the laser removal, the laser is operated at a higher pulse frequency, whereby the power of the laser given off drops off, so that the removal, compared to the laser operation during the frequency setting, is clearly lower. During this cleaning removal, the ablation products which were created during the frequency setting, are removed from the pill-box resonator as well as from the directly surrounding circuit, in that the laser beam, having a lower power, is guided once more over the pill-box resonator as well as the surrounding circuit. During the laser removal for setting the frequency, as well as during the laser cleaning, the focused laser beam is scanned using a fast xy galvano mirror system, which is not shown in the figures.

Figure 2:
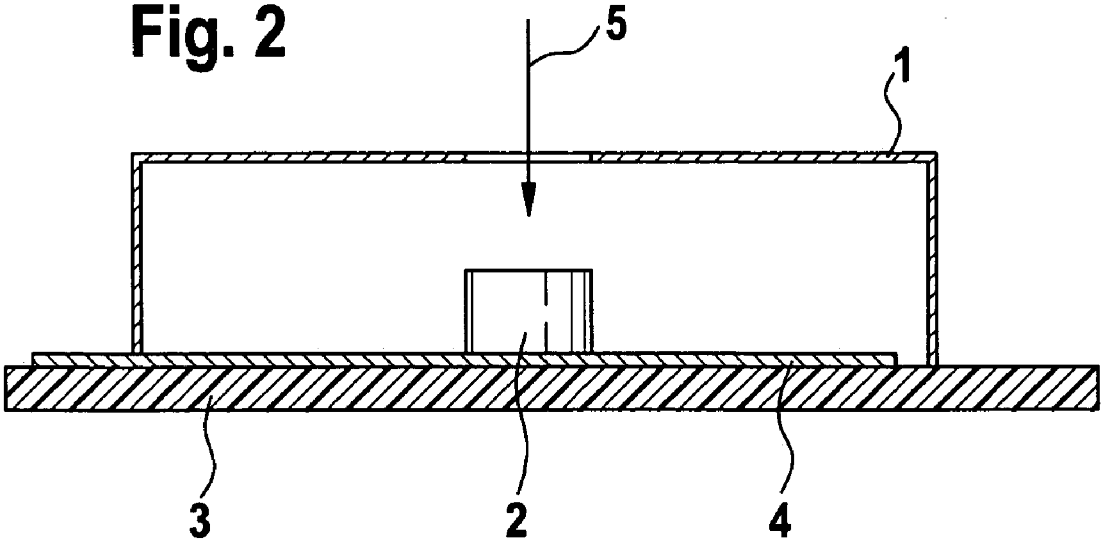
FIG. 2 shows a sectional illustration of the oscillator equipment to be processed.

FIG. 2 shows an illustration of how the adjustment as well as the cleaning of the pill-box resonator is performed. Pill-box resonator 2 lies directly under the bore through which the laser beam is guided. Pill-box resonator 2 is situated on a strip line 4 that is located on a substrate 3. Cover 1 closes off the oscillator circuit. The substrate is made of a material that is suitable for millimeter waves, such as teflon-like materials or HF ceramics. The diameter of the pill-box resonator is approximately 2 mm, and the thickness is D at typically 1 mm. If the laser beam was guided, for material removal of pill-box resonator 2, over pill-box resonator 2, using the galvano mirror system, then the laser is reduced in its output power upon reaching the target frequency of the oscillator circuit. Since solid-state lasers are usually not rapidly controllable, in their output power, by the electrical current supplied to them, and excimer lasers are usually not rapidly controllable, in their output power, by the discharge voltage of a solid-state laser, the pulse frequency of the laser is increased in order to reduce the power.

Figure 3:
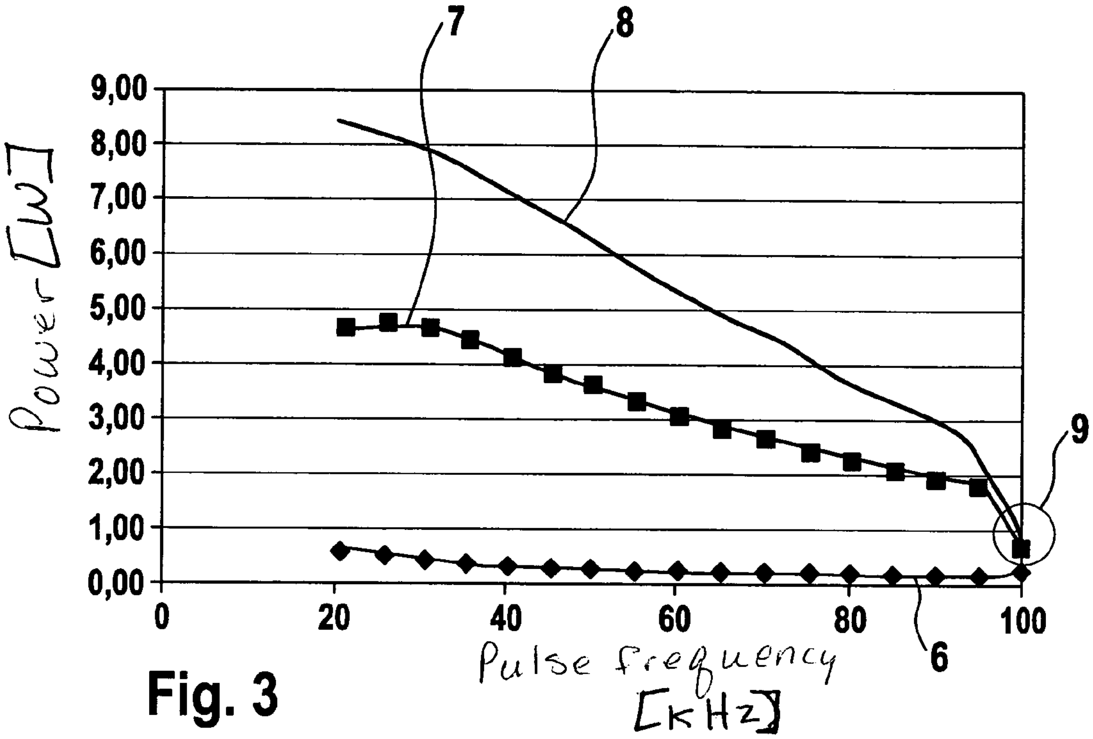
FIG. 3 shows a diagram of the laser power given off as a function of the pulse frequency of the laser and of the laser current.

FIG. 3 shows a diagram in which the output power is plotted against the pulse frequency of the laser as well as at various current strengths. For this, three characteristics lines 6, 7, 8 are plotted, which show the output laser power against pulse frequency at various current strengths. Characteristics line 6, in this context, represents the laser power at low laser current, and line 8 represents the output laser power at a high supply current. The operating point of the laser for ablating pill-box resonator 2 for frequency setting is, for example, on characteristics line 7 in a range of ca. 30 kHz, in this case, laser powers of 4-5 Watt being able to be output, for example. This focused laser beam is guided over pill-box resonator 2 using an xy galvano mirror system, so that pill-box resonator 2 is removed uniformly. According to the present invention, it may furthermore be provided, during the laser removal to flood the cavity, that is formed by cover 1 and substrate 3, with helium purge gas, in order to reduce the depositing of the ablation products. If the target frequency of the oscillator circuit is reached, the pulse frequency of the laser beam is increased to 100 kHz, for instance. In the example shown, in the range about 100 kHz, the powers output according to characteristics lines 6, 7, 8 drop off sharply, as shown, for example, by area 9 of the diagram. The laser power output at pulse frequencies of ca. 100 kHz are less than 1 Watt, for example. In this operating state, the focused laser beam is now once more guided over entire pill-box resonator 2, in order to remove the ablation products that were created during the frequency setting process. These ablation products may also have been deposited on the circuit, in the immediate area about pill-box resonator 2. For this reason, the opportunity is further created, using the power-reduced laser beam, of also scanning the circuit about the pill-box resonator, whereby these condensation products and ceramic dusts may also be removed.

Figure 4:
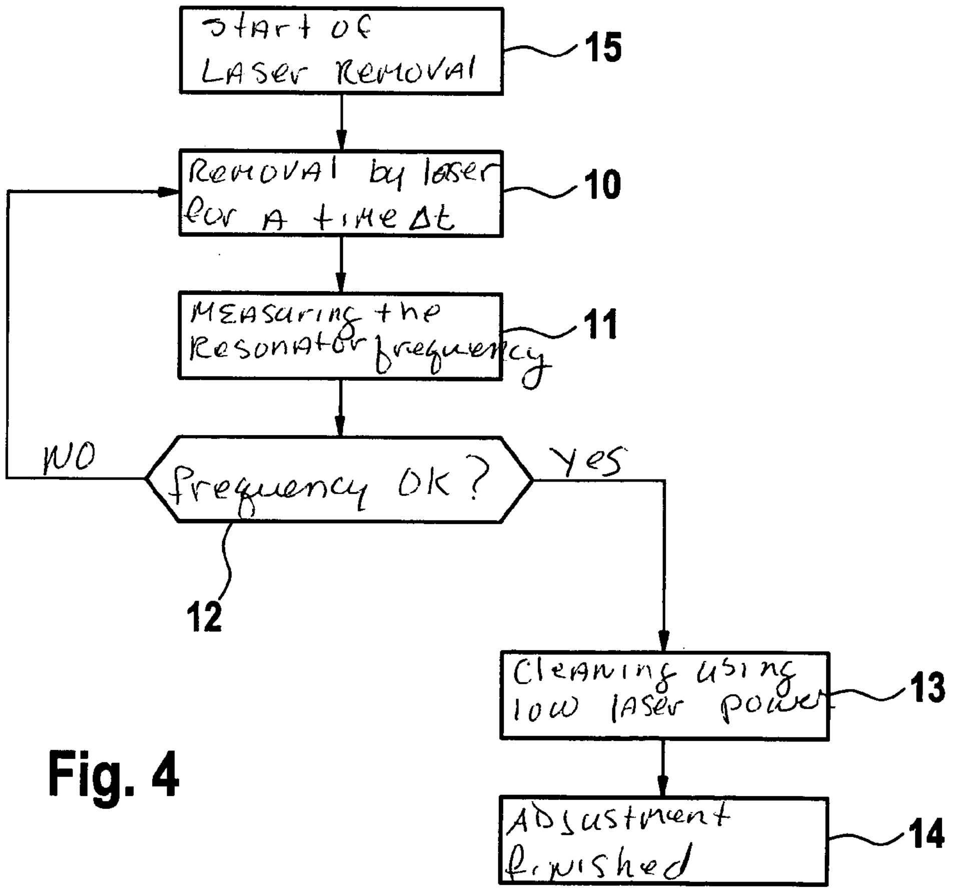
FIG. 4 shows a flow chart representing the method according to the present invention.

FIG. 4 shows the method according to the present invention as a flow chart. At step 15 there takes place the start of the laser adjustment to the target frequency. First, in method step 10, using a laser, such as an excimer laser or a diode pumped solid-state laser, a removal is carried out of pill-box resonator 2 for a specified time $\Delta t$, that corresponds to a prespecified number of laser pulses, such as 100. As the solid-state lasers one may use, for example, NdYAG lasers. After material has been removed form pill-box resonator 2 for the specified time $\Delta t$, in method step 11 the resonator frequency is measured. If, in method step 12, it is established that the target frequency has not yet been reached, branching to no takes place, and the method in step 10 is carried further, in that the removal by laser continues. This process runs iteratively until the specified frequency of the oscillator has been reached. If it is recognized in step 12 that the frequency lies in a specified range for the target frequency, the system branches to yes, and the method is continued in step 13. In step 13, the pulse frequency of the laser is increased in such a way that the power output is greatly reduced compared to the removal power. Thereupon the pill-box resonator and, if necessary the circuit surrounding the pill-box resonator is again scanned using the laser beam, whereby the deposit products, which have precipitated during the removal process, are removed. At the completion of this cleaning process as a result of a repeated scanning using lower laser power, the method ends in step 14, and the oscillator may be operated without long-term changes in the oscillator frequency caused by depositing products. During the removal process in step 10, as well as during the cleaning step in step 13, helium may be introduced into the cavity that is formed by cover 1 and substrate 3, whereby the depositing of the ablation products on the pill-box resonator and on the circuit may be reduced.

What is claimed is:

1. A method for cleaning a resonator in an oscillator, for an adjustment of the resonator, the method comprising:
- removing, using a laser, a dielectric material from an upper surface of the resonator until a specified frequency is attained, wherein the removing does not remove the entire upper surface;
- during the laser removal, flushing surroundings of the resonator with helium;
- reducing the laser power by operating the laser at a higher pulse frequency than was used during a resonator adjustment; and
- cleaning, using the laser, the resonator after the attaining of the specified frequency, wherein the cleaning of the resonator takes place using the laser operated at a low power.

2. The method according to claim 1, wherein, for the cleaning of the resonator, a pulse frequency of the laser is increased to such an extent that a power that is output drops off to ⅕ to ⅒ of the laser power used for the removal.

3. The method according to claim 1, further comprising, during the laser cleaning, flushing surroundings of the resonator with helium.

4. The method according to claim 1, wherein the flushing comprises at least partially removing air from a cavity surrounding the resonator, and the cavity is formed by a cover and a substrate of the oscillator.

5. The method according to claim 1, wherein the flushing reduces backscattering, toward the resonator and surroundings, of evaporated components of the dielectric material produced during the laser removal.

6. The method of claim 1, wherein the removing does not remove an edge portion of the upper surface of the resonator.

7. The method of claim 1, wherein an area processed during the cleaning is greater than an area processed during the removing.

8. The method of claim 7, wherein the area processed during the cleaning includes: an area processed during the removing, a portion of the upper surface of the resonator which was not processed during the removing and an area of a circuit adjacent to the resonator.

9. A method for cleaning a resonator in an oscillator, for an adjustment of the resonator, the method comprising:
- removing, using a laser, a dielectric material of the resonator until a specified frequency is attained;
- during the laser removal, flushing surroundings of the resonator with helium;
- reducing the laser power by operating the laser at a higher pulse frequency than was used during a resonator adjustment; and
- cleaning, using the laser, the resonator after the attaining of the specified frequency, wherein the cleaning of the resonator takes place using the laser operated at a low power, and
- wherein an area processed using the cleaning step is greater than an area processed during the removal.

10. The method of claim 9, wherein, for the cleaning of the resonator, a pulse frequency of the laser is increased to such an extent that a power that is output drops off to ⅕ to ⅒ of the laser power used for the removal.

11. The method of claim 9, further comprising, during the laser cleaning, flushing surroundings of the resonator with helium.

12. The method of claim 9, wherein the flushing comprises at least partially removing air from a cavity surrounding the resonator, and the cavity is formed by a cover and a substrate of the oscillator.

13. The method of claim 9, wherein the flushing reduces backscattering, toward the resonator and surroundings, of evaporated components of the dielectric material produced during the laser removal.

14. The method of claim 9, wherein the removing comprises removing the dielectric material from an upper surface of the resonator until the specified frequency is attained, and wherein the removing does not remove the entire upper surface.

15. The method of claim 14, wherein the area processed during the cleaning includes: an area processed during the removing, a portion of the upper surface of the resonator which was not processed during the removing and an area of a circuit adjacent to the resonator.

16. The method of claim 9, wherein the removing does not remove an edge portion of the upper surface of the resonator.

* * * * *